Aug. 2, 1938.      P. BAUMGARTEN      2,125,536
PHOTOGRAPHIC CAMERA WITH BUILT-IN DEVELOPING DEVICE
Filed Dec. 15, 1936
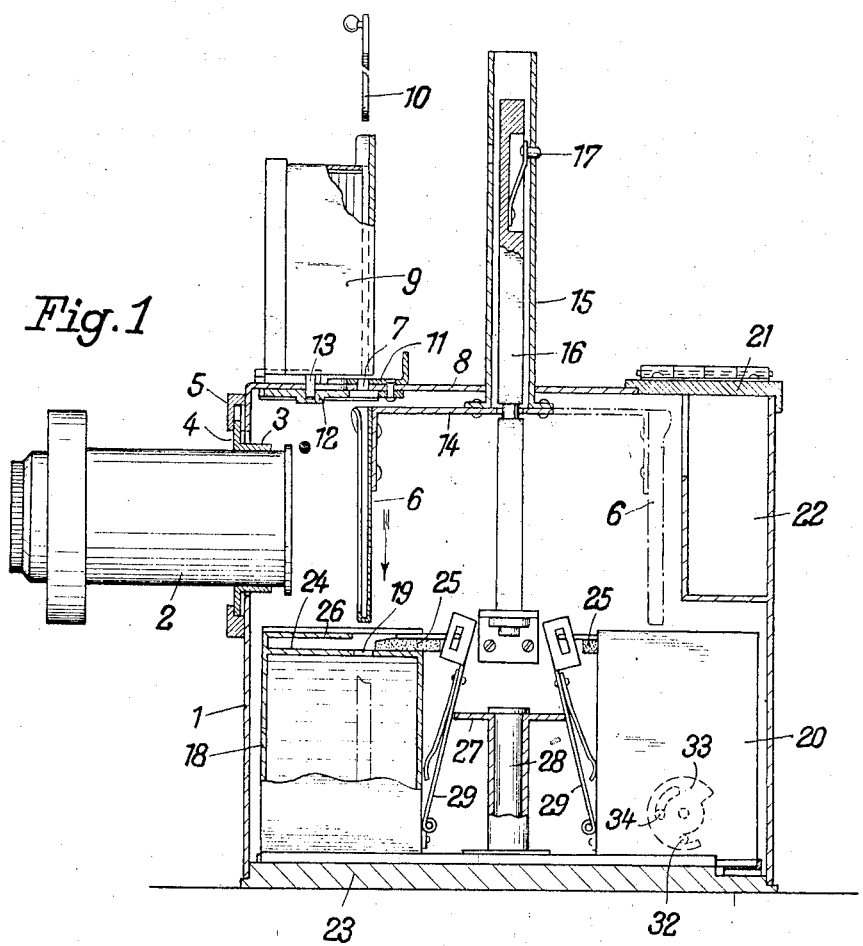
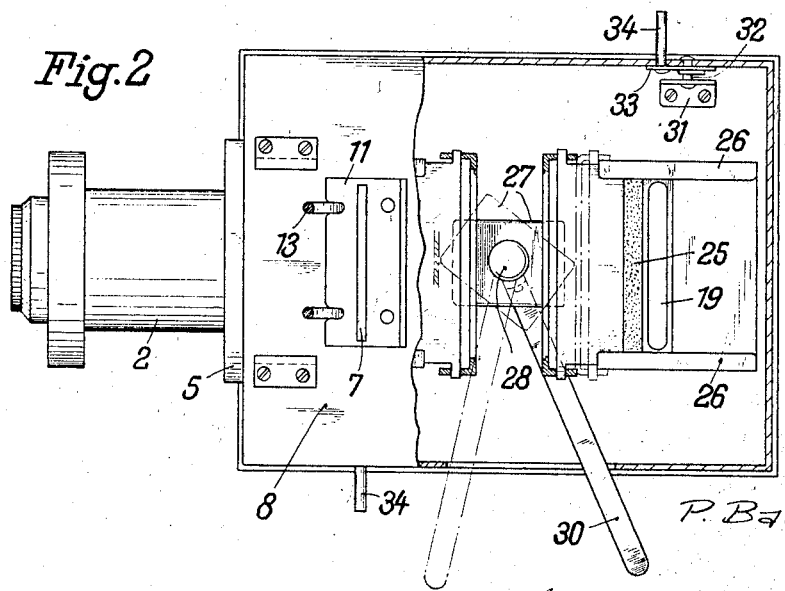
Inventor:
P. Baumgarten
By Glascock Downing & Seebold Patented Aug. 2, 1938

2,125,536

UNITED STATES PATENT OFFICE 2,125,536

PHOTOGRAPHIC CAMERA WITH BUILT-IN DEVELOPING DEVICE

Paul Baumgarten, Berlin-Halensee, Germany, assignor of one-half to Paul W. Rosenfeld, Berlin-Dahlen, Germany Application December 15, 1936, Serial No. 116,015
In Germany December 24, 1935

14 Claims. (Cl. 95—13)

The present invention relates to a photographic camera with built-in developing device and particularly to a camera of this kind which is equipped with means, which render it possible, as soon as a photo has been taken, to directly develop and fix it by some simple manipulations.

The camera according to the invention may be used in connection with sensitized plates and films or any other suitable bodies carrying a light-sensitive layer. The novel camera is of simple construction and allows the exposition and development of common negatives, from which positives may be copied by placing a negative on a sheet or the like carrying a sensitized layer, as well as the direct development of positives after the known positive process, and, after an object has been photographed, the copying of a negative on a positive by projection, and the development and fixing of the positive so produced.

The receptacles for the bath liquids are according to the invention preferably so arranged below the exposition chamber of the camera, that the plates or films to be developed, fixed and washed may be moved into the baths from above, through slots in the upper wall of the chamber in which the baths are located, by means of a rotatable and vertically reciprocable plate or film carrier. Means are also provided which can be actuated by a simple manipulation to close the said slots tightly from the outside, so that the apparatus with the baths may be carried as a hand camera of the usual kind, without liquid leaking out from the baths.

An embodiment of the invention is illustrated by way of example in the accompanying drawing.

Fig. 1 is a vertical section through the novel camera with developing device.

Fig. 2 is a plan view of the same camera with the upper wall or cover of the camera partially broken away to show the interior.

In the front wall of the camera box 1 the lens system 2 is slidably arranged in such a manner, that no light rays can enter the interior. For this purpose the lens system 2 is slidably seated in a sleeve or collar 3, which is formed with a flange 4 adapted to be received by a frame member 5 of substantially U-shaped cross-section, attached to the front wall of the camera box. The frame 5 is so dimensioned, that the flange 4 has some play in upward direction and laterally, so that the lens system 2 with the sleeve 3 can be removed by an upwardly and laterally directed movement. In its normal position the sleeve 3 is however so seated in the frame 5, that light rays are prevented from penetrating into the interior of the camera. This arrangement renders it possible to remove the lens system 2 in a simple way, when it is desired to copy by means of light rays let in through the opening in the front wall of the camera.

In the interior of the camera, behind the lens system 2, a guide frame 6 is arranged, which is adapted to receive the plates or films introduced through a slot 7 in the top wall 8 of the camera box. The plates or films, which are stored one behind one another in the magazine or exchange dark slide 9, may in a manner known per se be introduced into the frame 6 by means of a vertically reciprocable slide 10, located in the interior of the exchange dark slide 9 above the slot 7.

To effect this, the magazine 9 is at each exchange of plates or films moved laterally (to the left) until the slot in the bottom of it comes into alignment with the slot 7.

To keep light rays away from the interior of the camera and the magazine at the junction between these bodies, on the bottom of the magazine 9 a slide 10 is arranged, and this slide 10 carries pins, which, when the dark slide 9 is placed upon the camera, will enter apertures formed in the camera cover 8, whereby the magazine is rigidly secured to the camera box.

On the lower surface of the cover 8 another slide 12 is arranged, which is adapted to receive pins 12 fixed to the bottom of the exchange dark slide 9, so that, when the magazine is moved to the left into the position shown in Fig. 1, the bottom slide in it will come into alignment with the slot in the slide 11 and also with the slot 7 in the cover 8 of the camera box. During this movement of the magazine 9 the pins 13 will take the slide 12 along with them, whereby the slot in the slide 12 is brought into alignment with the slot 7 in the cover 8 of the camera box, so that a free passage to the frame 6 below is formed for the rearmost plate or film in the magazine 9. The frame 6 is arranged on a carrier 14 which by means of a hollow rod or handle 15 projecting from the cover 8 of the camera box may be rotated about the stationary shaft 16 and, after the release of a locking device, lowered along the stationary shaft 16. The locking device may for instance consist of a spring and a push button 17, arranged in the manner shown in Fig. 1. Below the carrier or frame 6 for the plates or films to be exposed, the developing vessel 18 is located.

This vessel has an opening 19 for the introduction of the carrier 6 with the plate or film, and when the rod 15 is lowered in axial direction the carrier 6 is dipped into the liquid in the vessel 18, whereby the plate or film in the carrier is developed.

The carrier 6 is thereupon by means of the rod 15 again lifted out of the vessel 18 and turned about 180° into the position indicated in dot-and-dash lines in Fig. 1. From this position the frame with the developed picture may be lowered into the container 20 for further treatment (fixing, washing, etc.). The vessel 20 is suitably of the same kind as the vessel 18. After finished treatment the carrier 6 is by means of the rod 15 lifted out of the vessel 20, and after opening of the flap or cover 21, the treated plate, film or paper is removed from the carrier 6 and placed in the chamber 22 at the rear end of the camera box for drying and storage.

In order that the vessels 18 and 20 containing the baths for transport may be securely and tightly closed by a single manipulation, the said vessels 18 and 20 are suitably detachably arranged on a common base plate 23.

On each of the slotted cover plates 24 of the vessels 18 and 20 a rubber moulding or closure 25 is slidably guided, which, when it is brought into closing position, covers the slot 19. In this position the front and the lateral edges of the moulding 25 are overlapped by guide mouldings 26 which press the moulding 25 firmly against the slot 19, so that in any position of the camera the leakage of liquid from the vessels 18 and 20 is securely prevented.

The rubber moulding 25 of the vessels 18 and 20 are together moved into their closing position and their inactive position. For this purpose a cam disc 27 is provided, which is rotatably arranged on stationary pivots 28 and is rotated by means of a projecting lever 30. The cam disc 27 cooperates with preferably yielding arms 29, fixed at their lower ends to the vessels 18 and 20 respectively and being connected to the mouldings 25 at their upper ends. By moving the lever 30 in one direction or the other the slots 19 are opened or closed. The position of the cam disc 27 and the lever 30 when the slots are closed is indicated by dot-and-dash lines.

In order that the vessels 18 and 20 containing the baths may be easily removed from the camera, for instance for refilling, the base plate 23 of the vessels simultaneously forms the bottom of the camera box and carries angular plates 31 (Fig. 2) fixed by means of screws. The plates 31 are provided with projecting pins 32 adapted to cooperate with rotatable discs 33 with hooks arranged on the side walls of the camera box. By means of pins 34 projecting from the outer surfaces of the side walls the hooks on the discs 33 can be brought into or out of engagement with the pins 32.

If instead of stiff plates of glass photographic films or photographic papers are to be used in the camera, each of these films or papers are placed in a small holder of sheet metal or the like, before being inserted into the dark slide 9. These holders are thereupon together with the films or papers introduced into the carrier 6.

I claim:—

1. In a developing camera for sensitized plates, comprising a camera box having a lens system, a vertically movable carrier to receive the plates to be exposed and developed and turnable about a vertical axis and arranged behind said lens system, and developing means comprising developing and fixing tanks enclosed within the camera box, said carrier being operable to dip the plates successively in said tanks.

2. In a developing camera for sensitized plates, comprising a camera box having a lens system, a vertically movable carrier to receive the plates to be exposed and developed and turnable about a vertical axis and arranged behind said lens system, and developing means comprising a pair of spaced developing and fixing tanks enclosed within said camera box, said carrier being arranged between said tanks and operable to dip the plates successively in said tanks by turning the carrier through an angle of 180°.

3. In a developing camera as claimed in claim 1, comprising means for vertically moving said carrier to dip the plates successively in said tanks, said means comprising an outwardly projecting handle secured to the carrier, and a vertically disposed fixed shaft carried by the camera box and slidably engageable with said handle for vertical movement of the carrier.

4. In a developing camera for sensitized plates, comprising a camera box having a lens system, a vertically movable carrier to receive the plates to be exposed and developed and turnable about a vertical axis and arranged behind said lens system, and developing means comprising developing and fixing tanks, an outwardly projecting handle secured to said carrier for vertically moving and turning said carrier, and means carried by said camera box for retaining said carrier in raised position.

5. In a developing camera as claimed in claim 4, in which said means for retaining the handle in raised position comprises a vertically disposed shaft carried by the camera box and slidably engageable with said handle for vertical movement of said carrier, a spring actuated pin carried by the shaft and releasably engageable with said handle for retaining the carrier in raised position.

6. In a developing camera for sensitized plates, comprising a camera box having a slot formed in the top wall thereof and having a lens system, a vertically movable carrier to receive the plates to be exposed and developed and turnable about a vertical axis and arranged behind said lens, a developing means enclosed within said camera box, a plate magazine carried by the camera box, a slot formed in the bottom of said magazine and adapted to register with the slot in the top wall of the camera box, and means for detachably securing said magazine to the camera box.

7. In a developing camera as claimed in claim 6, in which said means for securing the magazine to the camera box comprises a slotted slide carrying pins secured to the bottom of the magazine, another slotted slide arranged adjacent to the slot formed in the top wall of the camera box, said first slide connecting the magazine to the camera box for longitudinal slidable movement to move the second slide to form a free passage for the plates from the magazine into the camera.

8. In a developing camera for sensitized plates, comprising a camera box having a lens system, a vertically movable carrier to receive the plates to be exposed and developed and turnable about a vertical axis and arranged behind said lens system, and developing means comprising developing and fixing tanks, a slot formed in the cover of the camera box for the introduction of the plates to be exposed and developed, and a slot formed in the cover of the developing tank, said carrier in its position of plate exposure being located between and in alignment with said slots.

9. In a developing camera for sensitized plates, comprising a camera box having a lens system, a vertically movable carrier to receive the plates to be exposed and developed, said carrier being turnable about a vertical axis and arranged behind said lens system, developing means comprising developing and fixing tanks enclosed within the camera box, each of said tanks having a slotted opening formed in the top wall thereof, said carrier being operable through said openings to dip the plates successively in said tanks, and liquid-tight closure means for each of said slotted tank openings, said closure means comprising a member slidably mounted on the top wall of each tank, and closure operating means operable to simultaneously move the closure means to open or close said slotted tank openings.

10. In a developing camera as claimed in claim 9, in which said closure means comprises a yieldable member slidable on the top wall of each tank, and a guide on each of said tanks to slidably retain each of said closure members, said closure operating means for simultaneously opening and closing said tank openings comprising an interposed manually actuated member.

11. In a developing camera as claimed in claim 9, in which said closure means comprises, a yieldable member slidable on the top wall of each tank, and a yieldable guide on each of said tanks to slidably and yieldably retain said closure members over said tank openings, said closure operating means for simultaneously opening and closing said tank openings comprising an interposed manually actuated member.

12. In a developing camera as claimed in claim 9, in which said closure operating means for simultaneously opening and closing said tank openings comprises spring actuated means for normally retaining said slidable closure members in positions to uncover said slotted tank openings, and a manually actuated cam engageable with said spring actuated means for moving said slidable closure members to simultaneously cover said slotted tank openings.

13. In a developing camera of the character described comprising a camera box, a developing and a fixing tank enclosed within said box, and a storage chamber for the developed plates carried by and arranged within the camera box and arranged adjacent said fixing tank.

14. In a developing camera of the character described comprising, a camera box, the bottom wall of said camera box comprising a detachable base plate, developing and fixing tanks enclosed within said box and secured to the base plate, and locking means arranged adjacent to the diagonal corners of the box for detachably securing the base plate to the camera box.

PAUL BAUMGARTEN.